(12) United States Patent
Xu et al.

(10) Patent No.: US 7,817,574 B2
(45) Date of Patent: Oct. 19, 2010

(54) INTER-PACKET-NODE PAGING BETWEEN COMMUNICATION NETWORKS

(75) Inventors: Xiang Xu, Nanjing (CN); James S. Marin, Murphy, TX (US); Kris K. Marinovich, Streamwood, IL (US)

(73) Assignee: Motorola Mobility, Inc., Libertyville, IL (US)

(*) Notice: Subject to any disclaimer, the term of this patent is extended or adjusted under 35 U.S.C. 154(b) by 610 days.

(21) Appl. No.: 11/862,242

(22) Filed: Sep. 27, 2007

(65) Prior Publication Data

US 2008/0096584 A1 Apr. 24, 2008

Related U.S. Application Data

(60) Provisional application No. 60/862,112, filed on Oct. 19, 2006.

(51) Int. Cl.
*H04B 7/26* (2006.01)
*H04W 4/00* (2009.01)

(52) U.S. Cl. .................. 370/252; 370/335; 370/338; 370/342

(58) Field of Classification Search .................. None
See application file for complete search history.

(56) References Cited

U.S. PATENT DOCUMENTS

| 6,259,723 | B1* | 7/2001 | Miyashita | 375/141 |
|---|---|---|---|---|
| 6,816,472 | B1* | 11/2004 | Dillon et al. | 370/331 |
| 7,519,102 | B1* | 4/2009 | Futakata et al. | 375/141 |
| 2006/0148511 | A1 | 7/2006 | Bender et al. | |
| 2007/0076589 | A1* | 4/2007 | Stopler et al. | 370/210 |
| 2008/0285534 | A1* | 11/2008 | Dent | 370/342 |
| 2009/0034554 | A1* | 2/2009 | Evans et al. | 370/468 |

\* cited by examiner

*Primary Examiner*—Chi H Pham
*Assistant Examiner*—Soon-Dong D Hyun (57) ABSTRACT

A system and method is disclosed to provide inter-packet-node paging between communication networks. The networks recognize whether inter-network paging is supported therebetween and advertise overlapping codes between networks having adjacent location areas. When the mobile station moves from the first network to the second network, the first network determines whether the second network shares an overlapping code therewith. If the networks share an overlapping code, the first network sends a paging request to the second network including link configuration information and the notification for the mobile station, wherein the notification can be delivered to mobile station in the second location area of the second communication network without the mobile station having to register in the second communication network.

20 Claims, 10 Drawing Sheets

INTER-PACKET-NODE PAGING BETWEEN COMMUNICATION NETWORKS

FIELD OF THE INVENTION

The present invention relates generally to the field of communication systems, and more particularly, to a paging between communication networks.

BACKGROUND OF THE INVENTION

The Third Generation Partnership Project 2 (3GPP2) Code Division Multiple Access (CDMA), known as 3GPP2 cdma2000, networks support packet data and circuit switched voice communication. The original system supports packet data and circuits switched voice communication and is commonly referred to as the cdma2000 1X system. The cdma2000 1X system air interface is standardized in 3GPP2 document C.S0001 through C.S0005 and corresponding Telecommunication Industry Associates (TIA) standard TIA-2000. In addition, new packet data standards, such as cdma2000 High Rate Packet Data (cdma2000 HRPD) have been created. The cdma2000 HRPD air interface is standardized in 3GPP2 document C.S0024-B. To ensure communication continuity for a mobile radio communication device moving between overlaid 1x and packet data networks, it is desired to provide Cross-Paging capabilities that enables a mobile unit to be notified of incoming 1x circuit voice calls, or Short Message Service (SMS) messages when the mobile is operating on the HRPD network.

Figure 1:
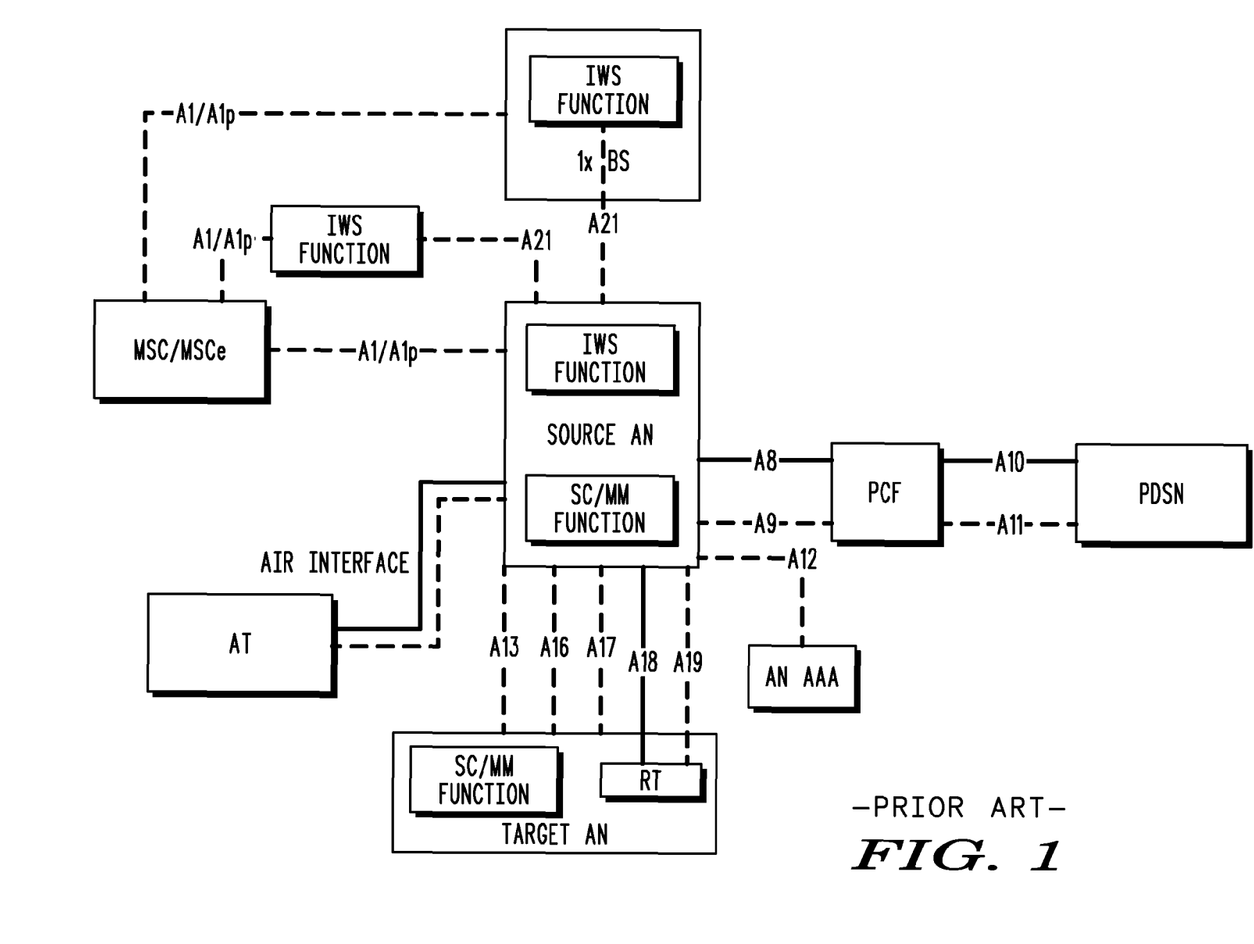
FIG. 1 shows an architecture for 3GPP2 A.S0008-B.
Figure 2:
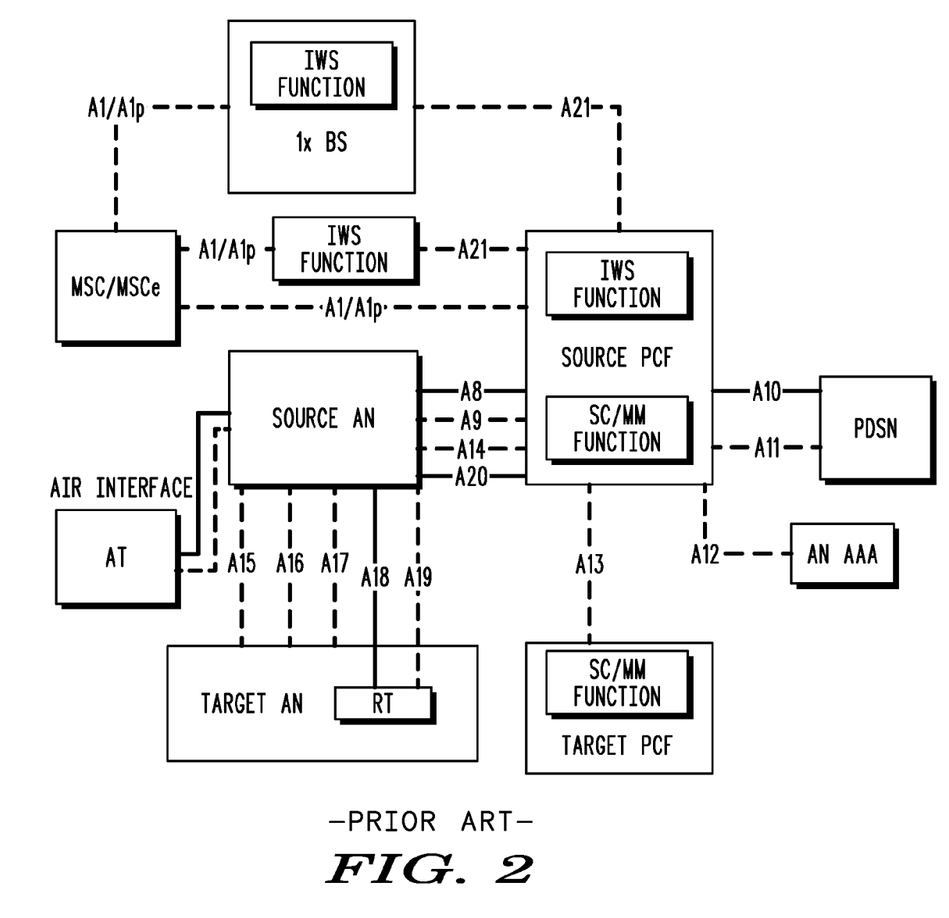
FIG. 2 shows an architecture for 3GPP2 A.S0009-B.

A 3GPP2 Radio Access Network (RAN) to support cross paging consists of an Mobile Switching Center (MSC), a 1x BS (Base Station), an HRPD AN (Access Network or Access Node), an HRPD PCF, and a Packet Data Serving Node (PDSN) and is standardized for two different RAN architectures in 3GPP2 A.S0008-B (see FIG. 1) and A.S0009-B (see FIG. 2). An interworking system (IWS) function has been introduced in 3GPP2 for connecting a HRPD system with a 1X system.

In addition, 3GPP2 C.S0024-A supports the Secondary ColorCode where an HRPD AN broadcasts the ColorCode used by neighboring ANs. The use of the Secondary ColorCode allows a dormant mobile to move between subnetworks of AN/PCFs that advertise overlapping ColorCode without performing registration. Proposals have been made to let an AN/PCF request a neighboring AN/PCF to transmit a page on its behalf, i.e. inter-AN paging. However, cross-paging from the 1x system to the HRPD system will fail when Inter-AN paging is used (or SecondaryColorCode support is enabled). Since the mobile does not perform registration in new sub-network, the 1x system will use the source subnetwork to do the cross-paging. This will cause the cross-paging to fail, since the mobile is in the new subnetwork. Moreover, current Inter-AN paging may not work, since the current technique does not transfer session information to target AN.

One proposed solution is to send the Cross-Paging request to both AN/PCFs, i.e. the first (source) subnetwork where the mobile station registered and the second (target) subnetwork where it has moved. However, this proposal does not work since only the AN/PCF of the first subnetwork has the Circuit Services Notification Application (CSNA) configuration for the mobile. The AN/PCF of the second subnetwork does not have the CSNA configuration for the mobile. Therefore, the CSNA state in the AN/PCF of the second subnetwork is in "Inactive State", which prevents sending any CSNA message to mobile.

Another proposed solution is to use existing Inter-AN paging. This proposal uses existing Inter-AN paging mechanism, i.e. source AN/PCF to send a Paging Request message to a target AN/PCF, then target AN/PCF sends the HRPD Page message to mobile. However, the current HRPD Page message does not contain the Cross-Paging information. Therefore, when the mobile receives the Page message, it will start the normal procedure, i.e. establish the session with the target AN/PCF, perform session transfer, and then perform 1x registration. This requires time to register. In addition, the 1x system may re-start the cross-paging delivery. But this will take several seconds till 1x system knows that the mobile is in the target subnetwork, which may cause 1x page timer out. As a result, the currently proposed solutions cannot solve the problems mentioned above.

What is needed is a new technique to provide Inter-AN paging. More, particularly, it would be of benefit to provide an extended Inter-AN paging procedure to support 1x to HRPD cross-paging in neighboring ANs, while reducing the number of registrations by the mobile station.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

The present invention introduces a new technique to provide Inter-AN paging. More, particularly, the present invention provides an extended Inter-AN paging procedure to support 1x to HRPD cross-paging in neighboring ANs, while SecondaryColorCode is enabled to reduce the number of registrations by the mobile station. Specifically, an enhanced paging request is introduced to guarantee that Cross-paging works when a dormant mobile station moves between subnetworks. In addition, the present invention provides an extended Inter-AN paging procedure to deliver the HRPD page and DataOverSignaling in neighboring ANs.

In practice, dual mode cdma2000 mobile stations (MS) or Access Terminals (AT) are available that are capable of supporting communications with both cdma2000 1X circuit-switched and High Rate Packet Data (HRPD) networks. A dual mode mobile station or access terminal is also known as a Hybrid Access Terminal or HAT. One or more ANs are connected to a PCF and facilitate the transport of data packets between a MS and a Packet Data Serving Node (PDSN), which is connected to additional networks outside the access network, such as the Internet. An MS's packet data session may be in a dormant or active state.

An MS's packet data session is considered to be in the active state when a traffic channel, and A8 and A10 bearer resources have been allocated to the MS to facilitate the transfer of packet data between the PDSN and MS.

An MS's packet data session is considered to be in the dormant state when a UATI and A10 bearer resources have been allocated to the MS, but no traffic channel or A8 bearer resources have been allocated to the MS. Little or no data can be exchanged between the MS and PDSN when the packet data session is in the dormant state, however, the session can be reactivated quickly, i.e. the MS's packet data session is transitioned to the active state, when new data needs to be sent from the either the MS or PDSN.

As used herein, an MS can be any communication device or user equipment that communicates wirelessly. MSs can include any type of communication device including a radio telephone, personal digital assistant, computer, cordless phone, and the like. As described herein, the present invention is described in the context of a wireless communication devices supporting the cdma2000 standards including cdma2000 1X, and HRPD air interface standards. However, it should be recognized that the present invention can also be used in devices supporting various other air interface standards, e.g. IEEE 802.11 or IEEE 802.16 (WiMAX) and that the descriptions used herein are by way of example only.

As used herein, the following IOS interface references and definitions apply:

The A1/A1p interface carries signaling information between the call control and mobility management functions of the MSC/MSCe and the BS (BSC) or the IWS component.

The A2 interface is used to provide a path for user traffic. The A2 interface carries 64/56 kbps PCM information (for circuit-oriented voice) or 64 kbps Unrestricted Digital Information (UDI, for ISDN) between the Switch component of the MSC and the Selection/Distribution Unit (SDU) function of the BS.

The A8 interface carries user traffic between the HRPD AN and the and the Packet Control Function (PCF).

The A9 interface carries signaling information between the HRPD AN and the PCF.

The A10 interface carries user traffic between the PCF and the PDSN.

The A11 interface carries signaling information between the PCF and the PDSN.

The A12 interface carries signaling information related to terminal authentication between the SC/MM function in the AN or PCF and the AN-AAA (Access Network Authentication, Authorization and Accounting entity).

The A13 interface carries signaling information between the SC/MM function of a source packet data node (AN or PCF depending on HRPD architecture supported) and the SC/MM function in the target packet data node (AN or PCF).

The A14 interface carries signaling information between the SC/MM function of the PCF and AN (only for A.S0009).

The A15 interface carries signaling information between AN when inter-AN paging is supported by an HRPD PCF (only for A.S0009).

The A16 interface carries signaling information between the source AN and the target AN for HRPD Inter-AN Connected State Session Transfer (hard handoff).

The A17 interface carries signaling information between a source AN and a target AN to manage resources in support of inter-AN cross-connectivity (soft/softer handoff).

The A18 interface transports user traffic (i.e., air interface traffic channel data) for an AT between the source AN and a target RT during cross-connectivity.

The A19 interface carries RT-specific bearer-related cross-connectivity control messages for an AT between the source AN and a target RT.

The A20 interface carries user traffic between the SC/MM function in the PCF and the AN (only for A.S0009).

The A21 interface carries signaling information between the HRPD AN/PCF and the A HAT is a dual mode cdma2000 mobile capable of supporting both the 1x and HRPD air interface standards (3GPP2 C.S0001-C.S0005, C.S0024, C.S0075 and C.S0082).

A Source AN/PCF is the HRPD AN/PCF that is connected via an A10 connection to a PDSN used for supporting the HAT's packet data session in the HRPD network.

A Target AN/PCF is the HRPD AN/PCF that serves the HAT when it moves from the Source AN/PCF. The Source and Target AN/PCF control different packet zones or subnetworks, which can be used interchangeably herein. In present invention, the Source AN/PCF and Target AN/PCF advertise an overlapping colorcode.

A MSC is the 1X MSC where the HAT is registered for circuit services (mobile is within this MSCs location area).

It should be noted that in the current 3GPP2 HRPD architecture the Interworking-Solution (IWS) can be collocated with the SC/MM in the AN (A.S0008 standard) or the PCF (A.S0009 standard), or collocated with 1x BS, or as a standalone entity.

Figure 3:
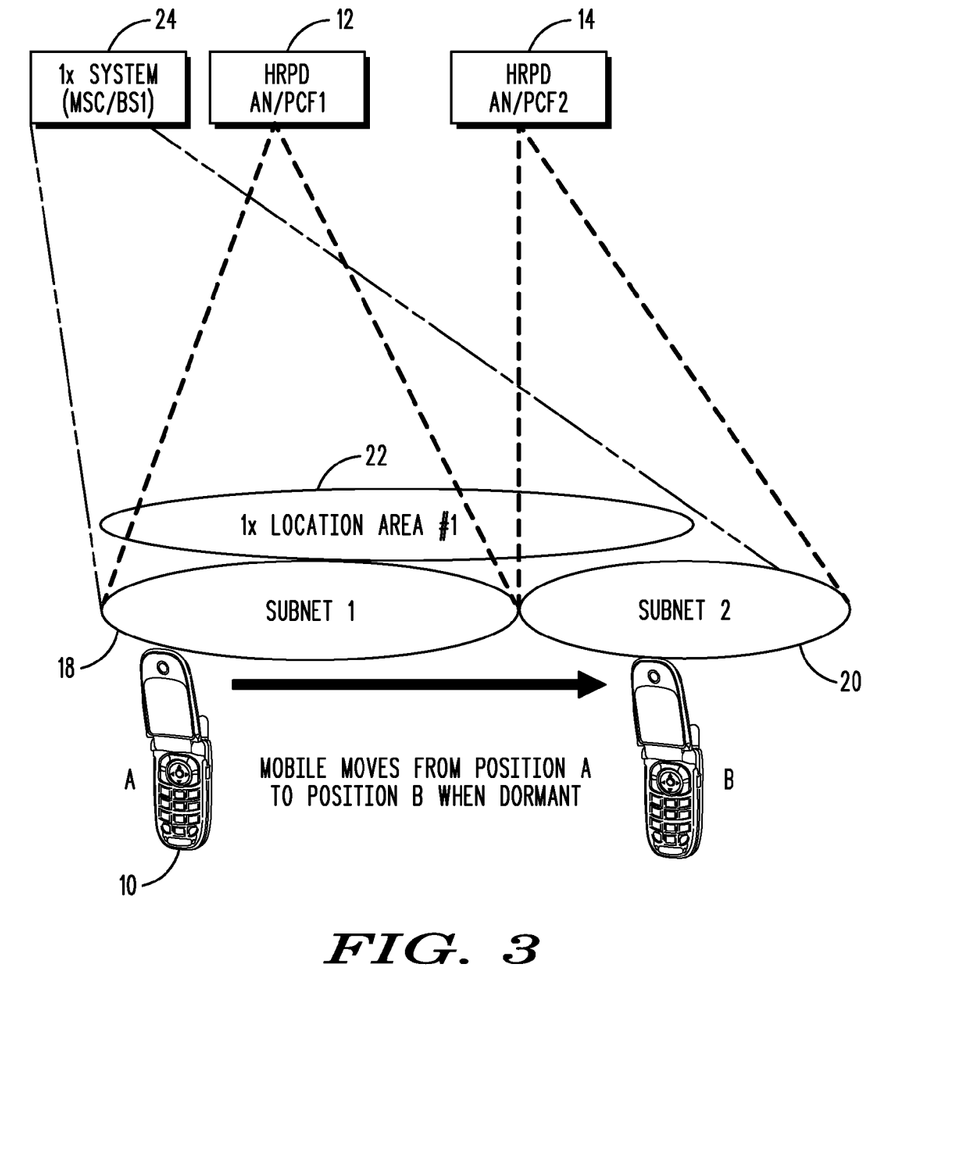
FIGS. 3 and 4 show a simplified diagram of a problem scenario.

Referring to FIG. 3, and as used herein, an MS 10 may also be referred to as user equipment (UE) or an Access Terminal (AT). In a cdma2000 1X system, a geographic area is served by a Mobile Switching Center (MSC) that serves its own 1x location area 22, via a 1x BS that is connected with the MSC 24. A High Rata Packet Data network overlays the cdma2000 1X network with subnets (or packet zones). Each subnet or packet zone is served by a Packet Control Function (PCF) and one or more Access Networks (AN). A single AN collocated with a PCF is shown for each subnetwork, though each PCF may also support multiple ANs, all within the PCFs subnet or packet zone boundary. A subnetwork boundary or packet zone is served by one PCF. For example, AN1 node 12 provides packet data service for Subnet 1 18, and AN2 node 14 provides packet data service for Subnet 2 20.

A Source AN/PCF 12 is an HRPD AN/PCF (AN/PCF1) that the mobile's packet data session is anchored, i.e. has an A10/A11 interface connection with a PDSN (not shown) that can support an MS's packet data session in the HRPD network. The Target AN/PCF (AN/PCF2) 14 serves a second packet zone or subnetwork 20. Typically, a dormant handoff and registration is required as the MS moves between the Source AN/PCF and Target AN/PCF.

The MSC is the 1X MSC where the MS 10 is registered for circuit-switched services (mobile is within this MSC's location area 22).

Figure 4:
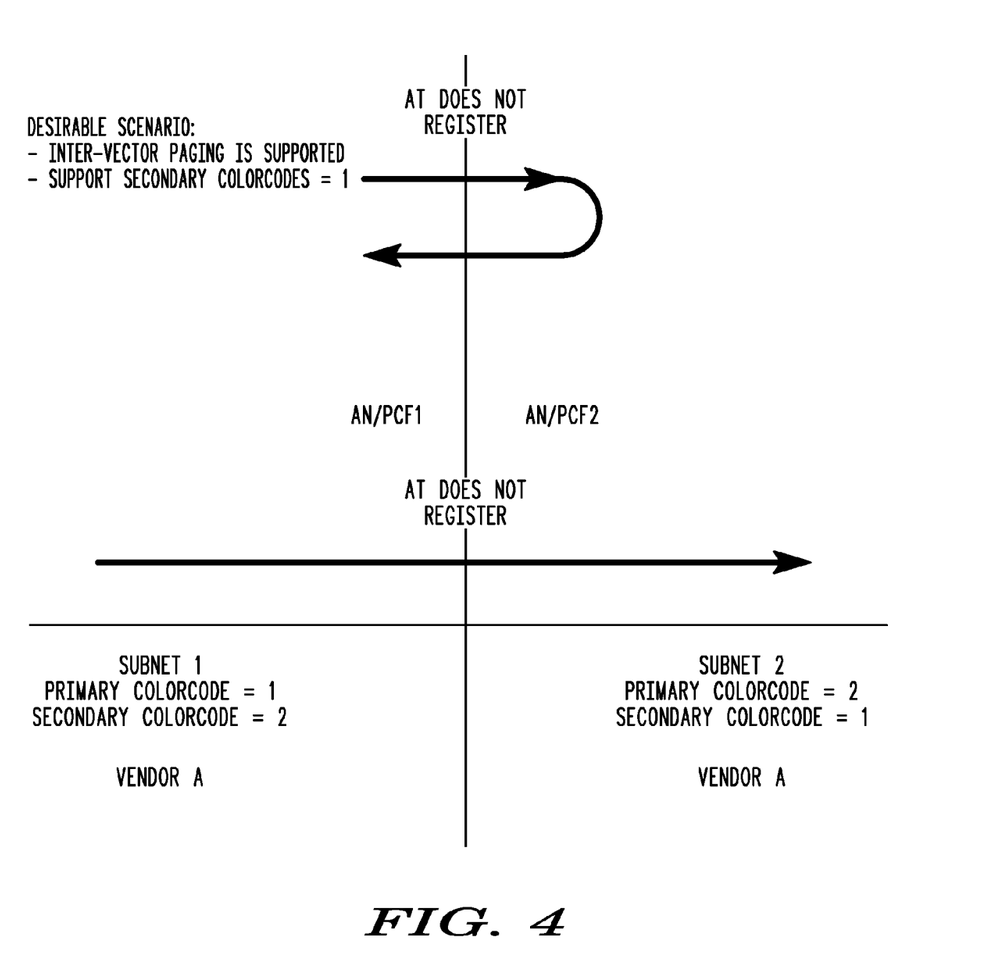

Referring to FIG. 4, 3GPP2 C.S0024-A and C.S0024-B supports the SecondaryColorCode where an AN broadcasts the ColorCode used by neighboring ANs. The use of a SecondaryColorCode allows a dormant mobile to move between subnetworks that advertise overlapping ColorCode without performing registration. The advertisement of SecondaryColorCode values might require the access network to deliver pages across subnet boundaries into areas in other subnets with the same ColorCode value that is advertised in the SecondaryColorCode values.

For example, in FIG. 4, when the mobile moves from subnet 1 (under AN/PCF1) to subnet 2 (under AN/PCF2), the mobile does not need to perform HRPD registration since the SecondaryColorCode (i.e. 1) for subnet 2 is the same as the ColorCode of subnet 1. Therefore, AN/PCF 1 can request neighboring AN/PCF2 to transmit a page on its behalf to the mobile, i.e. inter-AN paging. Also, if the mobile does not change 1x registration areas, the mobile also does not perform 1x registration via HRPD system. As a result, the 1x system will still have a cross-paging association that points to AN/PCF1. Similar, if a mobile is originally registered in subnet 2 and moves to subnet 1 (under AN1), the mobile does not need to perform HRPD registration since the SecondaryColorCode (i.e. 2) for subnet 1 is the same as the ColorCode of serving subnet 2. Also, if the mobile does not change 1x registration areas, the mobile also does not perform 1x registration via HRPD system. As a result, the 1x system will still have a cross-paging association that points to AN/PCF2.

It should be noted that a similar concept is also used by HRPD Rev. C (phase 2 evolution air interface specification), which defines a Primary Zone and Secondary Zone that are similar to Primary ColorCode and Secondary ColorCode in HRPD Rev. A as described above.

In either case, the use of Primary and Secondary ColorCodes (or Zones) causes problems for 1x to HRPD cross-paging. Referring back to FIG. 3, a 1x system (MSC for A1/A1p based cross-paging, or a 1x BS1 for A21-based cross-paging) have the cross-paging association that points to the AN/PCF 1 12 for the mobile 10. The mobile is in dormant state on HRPD system, and moves from position A (subnet 1) to position B (subnet 2). Since both subnetworks advertise an overlapping ColorCode (as shown in FIG. 4), the mobile does not perform registration in position B assuming it has previously registered in subnet 1. When 1x to HRPD cross-paging (i.e. it can be a 1x page, or a mobile-terminated SMS) is needed, 1x MSC (or 1x BS1) sends a Paging Request to AN/PCF1. However, since the mobile is in subnet 2, paging in subnet 1 will fail. Moreover, for a regular inter-AN page, the target AN needs to know some necessary attributes in order to successfully page the mobile. These attributes includes for example, PreferredControlChannelCycle, SlottedMode, PagingMask, and QuickPaging, etc. This problem may also exist for HRPD Rev. C since Rev. C use a similar idea as Secondary ColorCode. As a result, a solution is needed to support 1x to HRPD cross-paging when inter-AN paging is used, and to support the regular inter-AN paging. In the discussion below, 1x Page delivery is used as a cross-paging example, so the 1x message is Paging Request. It should be noted that this can also be used for other 1x to HRPD cross-paging, for example, mobile-terminated SMS delivery that uses an ADDS page message in 1x system.

One possible solution could be to have the 1x system send the paging request to both AN/PCFs. However, this solution does not work since only AN/PCF1 has the CSNA configuration for the mobile. AN/PCF2 does not have the CSNA configuration for the mobile. The CSNA state in AN/PCF2 is in "Inactive State", which prevents sending any CSNA message to mobile.

Another possible solution could be to use an existing Inter-AN paging mechanism. Upon the AN/PCF2 receiving a Paging Request message, AN/PCF2 sends the HRPD Page message to mobile. However, this solution also would not work since the current HRPD Page message does not contain the Cross-Paging information. So when a mobile receives the Page message, it will start the normal procedure, i.e. establish the session with AN/PCF2, perform session transfer, and then perform 1x registration. The 1x system may re-start the cross-paging delivery after the mobile performs 1x registration in subnet 2. But this will take several seconds that may cause 1x page timer out.

Another possible solution could be to add a paging response and paging response acknowledge message pair to enable the target AN to notify the source AN that the target AN already acquires the MS/AT, and add an event notification and event notification acknowledge message pair to save paging resources when the source AN knows itself or the target AN acquires the MS/AT. However, this solution does not consideration transfer of the session information to target AN/PCF, nor consideration the support for 1x to DO cross-paging. Therefore, none of these above solutions solve the problems mentioned above.

The present invention solves the above problems by extending Inter-AN paging procedure to support 1x to HRPD cross-paging in neighboring ANs. Specifically, modified messages are provided that contain new signaling information. One novel aspect of the present invention is to have an enhanced Inter-AN Paging message that contains Session State Information Record (SSIR) that allows neighboring AN/PCF setup CSNA for the mobile. The Session Information Record (SSIR) can also support the regular inter-AN paging and for mobile terminated DataOverSignaling deliver. Another novel aspect of the present invention is to have the Inter-AN Paging message contain the Encapsulated HRPD message that carries the 3G1xServices message for 1x to HRPD cross-paging, or the DataOverSignaling message for HRPD DataOverSignaling. Another novel aspect of the present invention is to have an Inter-AN paging reject message that allows the mobile station to reject the 1x page via neighboring AN/PCF. Another novel aspect of the present invention is to have an Inter-AN paging "delivered" message that indicates to a 1x system that mobile-terminated SMS has been successfully delivered to mobile. Another novel aspect of the present invention is to have an Inter-AN paging "delivered" signaling message that indicates to source AN/PCF that mobile-terminated HRPD DataOverSignaling has been successfully delivered to mobile. These aspects will now be detailed below.

Figure 5:
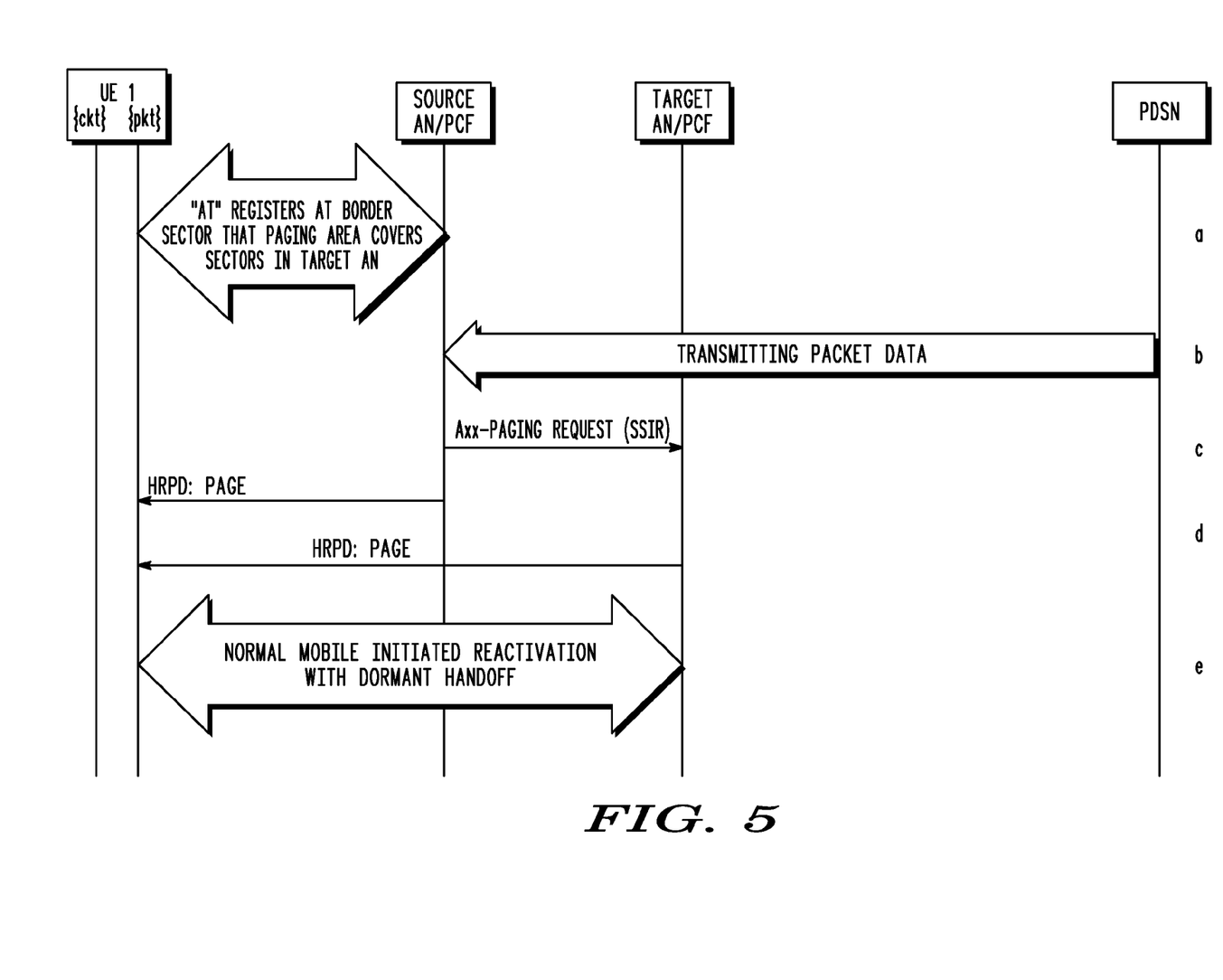
FIG. 5 shows a simplified call flow diagram in accordance with a first embodiment of the present invention.

Referring to FIG. 5, a call flow for regular Inter-AN Paging between communication network or subnetworks for a dormant mobile station is described in accordance with the present invention. The Source AN/PCF and Target AN/PCF advertise overlapping color code. In step a), the mobile station is registered in the Source AN/PCF. The mobile is in a border area that paging area covers sectors in target AN/PCF. In step b), the PDSN sends packet data to the source AN/PCF. In step c), the Source AN/PCF determines that it needs to page the mobile in neighboring subnetwork. The Source AN/PCF sends an Axx-Paging Request message to Target AN/PCF. As used herein, the Axx refers to any suitable interface for sending a page request message. In accordance with the present invention, the Axx-Paging Request message contains the Session State Information Record (SSIR) so that the target AN/PCF can properly deliver page messages to the mobile station (UE 1). In step d), based on the information received in the Axx-Paging Request message, the source AN/PCF and the target AN/PCF simultaneously transmit the Page message to the AT over the control channel. This call flow assumes that the AT receives the Page message from the target AN/PCF. If the AT receives the Page message from the source AN/PCF, then the AT accesses through the source AN/PCF. In step e), the mobile establishes the session with target AN/PCF, and performs dormant handoff.

Figure 6:
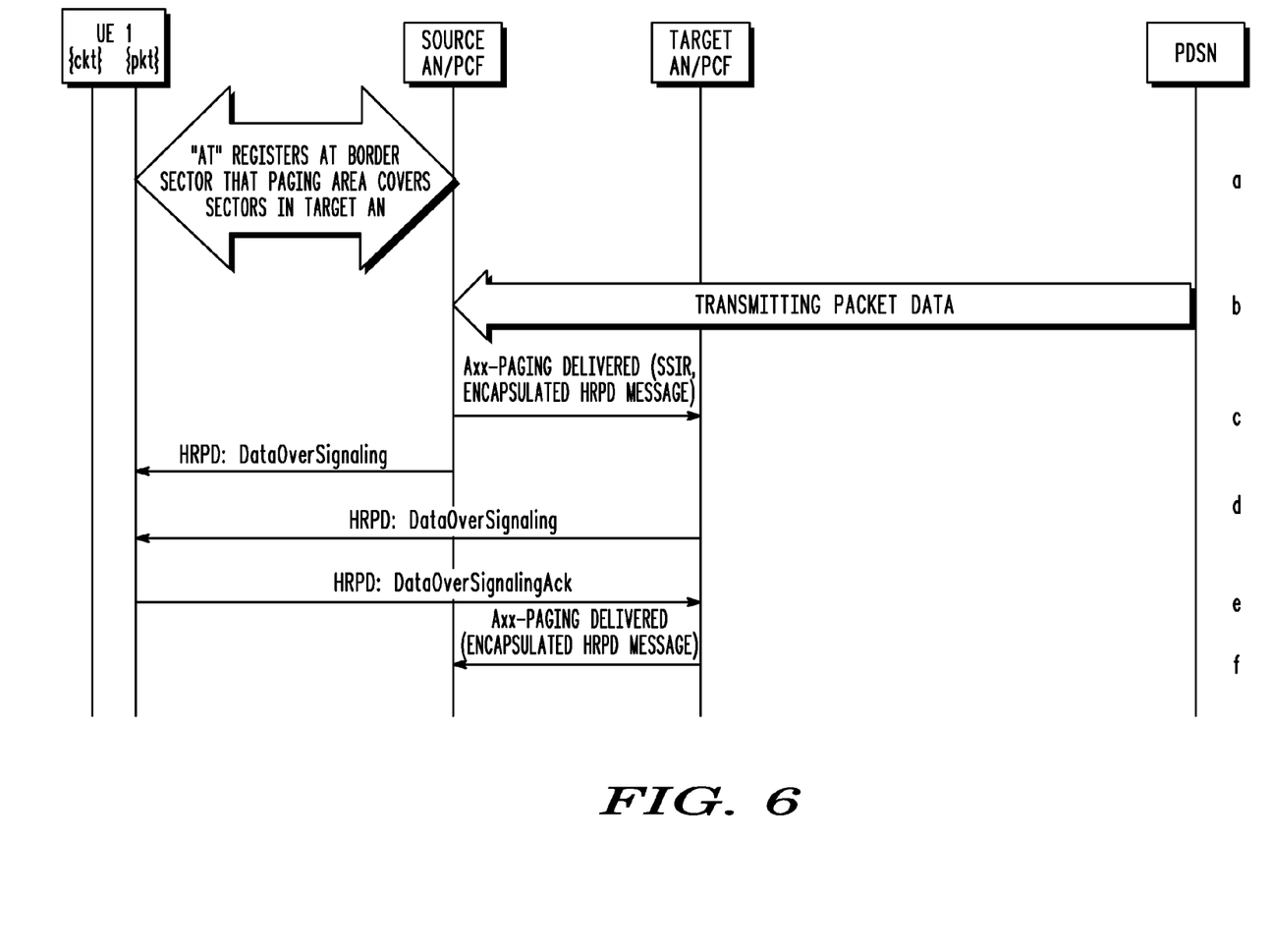
FIG. 6 shows a simplified call flow diagram in accordance with a second embodiment of the present invention.

Referring to FIG. 6, a call flow for regular Inter-AN Paging between communication networks or subnetworks with mobile terminated DataOverSignaling (DOS) delivery for a dormant mobile station is described in accordance with the present invention. Source AN/PCF and Target AN/PCF advertise an overlapping colorcode. In step a), the mobile is registered in the Source AN/PCF. The mobile is in a border area that paging area covers sectors in target AN/PCF. In step b), the PDSN sends packet data to the source AN/PCF. PCF decides to use DataOverSignaling (DOS) to send the packet data to the mobile station. In step c), the Source AN/PCF determines that it needs to deliver the DOS to the mobile in neighboring subnetwork. The Source AN/PCF sends an Axx-Paging Request message to Target AN/PCF. In accordance with the present invention, the Axx-Paging Request message contains the Session State Information Record (SSIR) so that the target AN/PCF can properly deliver DataOverSignaling messages to the mobile station (UE 1), as well as the Encapsulated HRPD Message for DataOverSignaling message. In step d), based on the information received in the Axx-Paging Request message, the source AN/PCF and the target AN/PCF simultaneously transmit the DataOverSignaling message to the AT over the control channel. This call flow assumes that the AT receives the DataOverSignaling message from the target AN/PCF. If the AT receives the DataOverSignaling message from the source AN/PCF, then the AT accesses through the source AN/PCF. In step e), upon the mobile receiving the DataOverSignaling message, the mobile sends an DataOverSignalingAck message to the target AN/PCF. In step f), Target AN/PCF sends a Axx-Paging Delivered message that contain the Encapsulated HRPD Message to the Source AN/PCF to acknowledge that the DOS has been successfully delivered to mobile. The Encapsulated HRPD Message is the HRPD DataOverSignalingAck message.

Figure 7:
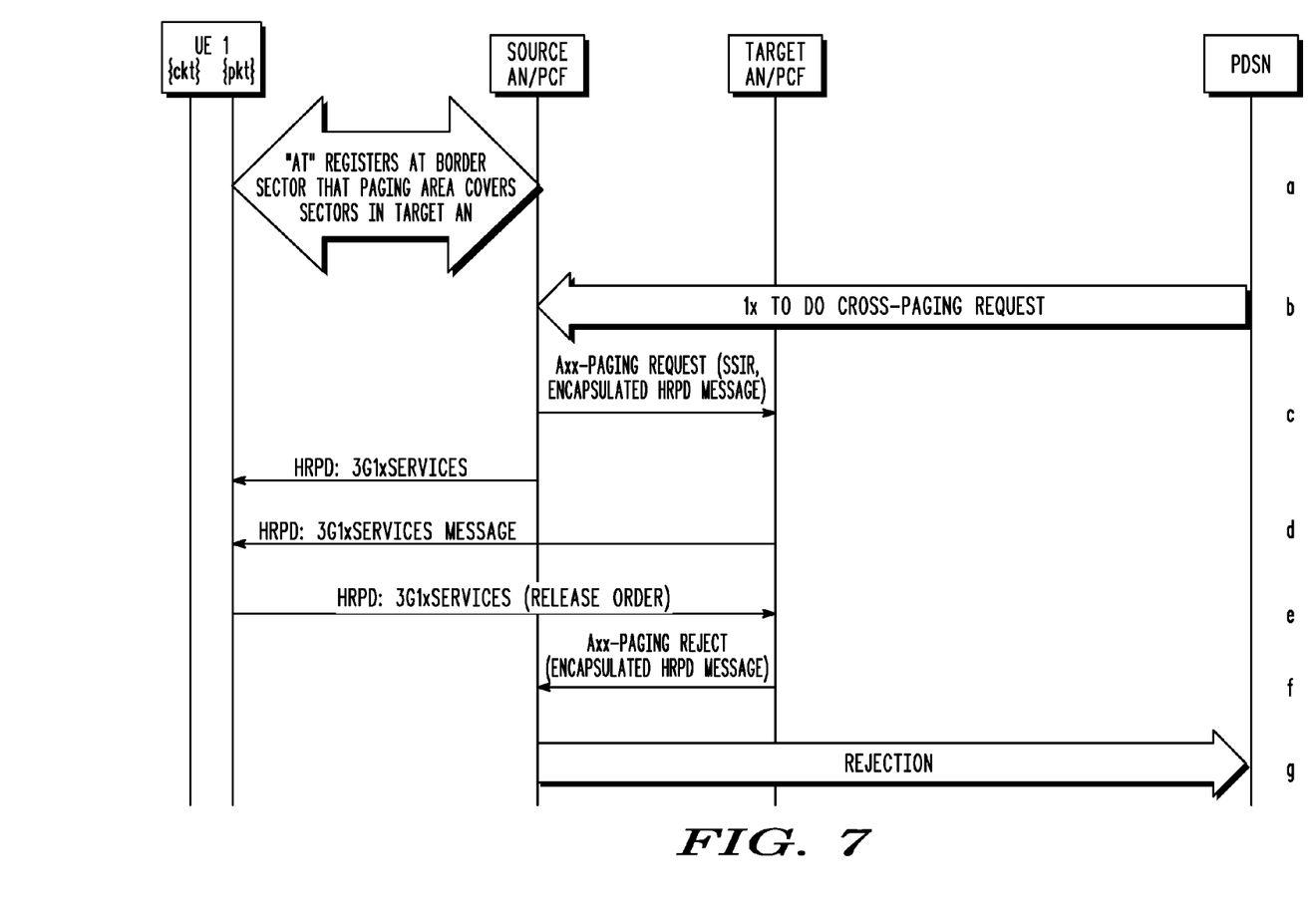
FIG. 7 shows a simplified call flow diagram in accordance with a third embodiment of the present invention.

Referring to FIG. 7, a call flow is described for Inter-AN dormant state paging for a mobile station with 1x page delivery when a source AN/PCF want to page an AT in a sector belonging to a target AN/PCF, in accordance with the present invention. Please note that this call flow can also be used for mobile terminated Short Message Service (SMS) message delivery for the HRPD communication network based on A.S0008. The Source AN/PCF and the Target AN/PCF advertise an overlapping colorcode. In step a) The mobile is registered in the Source AN/PCF. The mobile is in a border area that paging area covers sectors in target AN/PCF. In step b), the 1x system determines that an incoming call terminates to an MS/AT within its serving region. The 1x system sends a paging request (Note: this can be an A1-Paging Request message if IWS is collocated in an AN for A.S0008 (PCF for A.S0009); or an A21-1x Air Interface Signaling message if IWS is collocated in 1x BS or as a standalone entity) to the source AN. In step c), the Source AN/PCF determines that it needs to page the mobile in neighboring subnet. The source AN/PCF sends an Axx-Paging Request message to target AN/PCF. The Axx-Paging Request message contains the Session State Information Record (SSIR), and the Encapsulated HRPD Message, in accordance with the present invention. The Encapsulated HRPD Message contains the 3G1xServices message. In step d), based on the received information in Axx-Paging Request message, the source AN/PCF and the target AN/PCF simultaneously transmit the 3G1xServices message to the AT over the control channel. This call flow assumes that the AT receives the 3G1xServices message from the target AN/PCF. If the AT receives the 3G1xServices message from the source AN/PCF, then the AT accesses through the source AN/PCF. In step e), this call example assumes that the user rejects the 1x page. The mobile sends a 1x Release order encapsulated in an HRPD CSNA message to reject the 1x page. In step f), the target AN/PCF sends an Axx-Paging Reject message to source AN/PCF. The message contains the Encapsulated HRPD Message, in accordance with the present invention. In this step, the Encapsulated HRPD Message contains the 3G1xServices message that encapsulates the Release order message received from mobile via CSNA. In step g), the source AN/PCF forwards the rejection message to 1x system.

When this call flow is used for a mobile terminated Short Message Service (SMS) delivery for the HRPD communication network based on A.S0008, the 1x system sends the request to the Source AN/PCF in step b. The request is an ADDS Page message when the IWS is collocated in the HRPD AN, or an A21-1x Air Interface Signaling message when IWS is collocated in the 1x BS, or as a standalone entity. In step c, the Encapsulated HRPD Message contains the 3G1xServices Message that encapsulates the 1x Data Burst message.

Figure 8A:
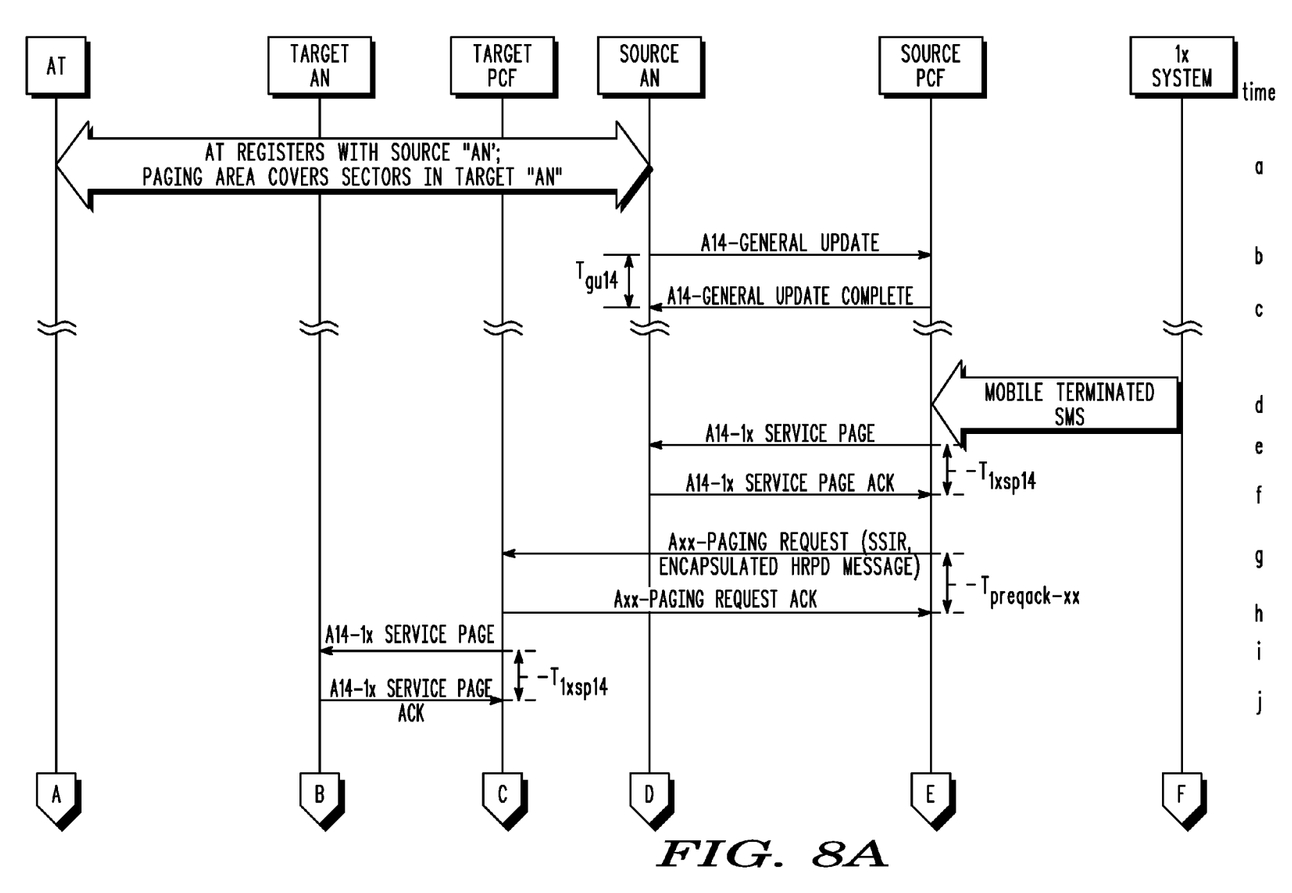
FIG. 8 shows a simplified call flow diagram in accordance with a fourth embodiment of the present invention.
Figure 8B:
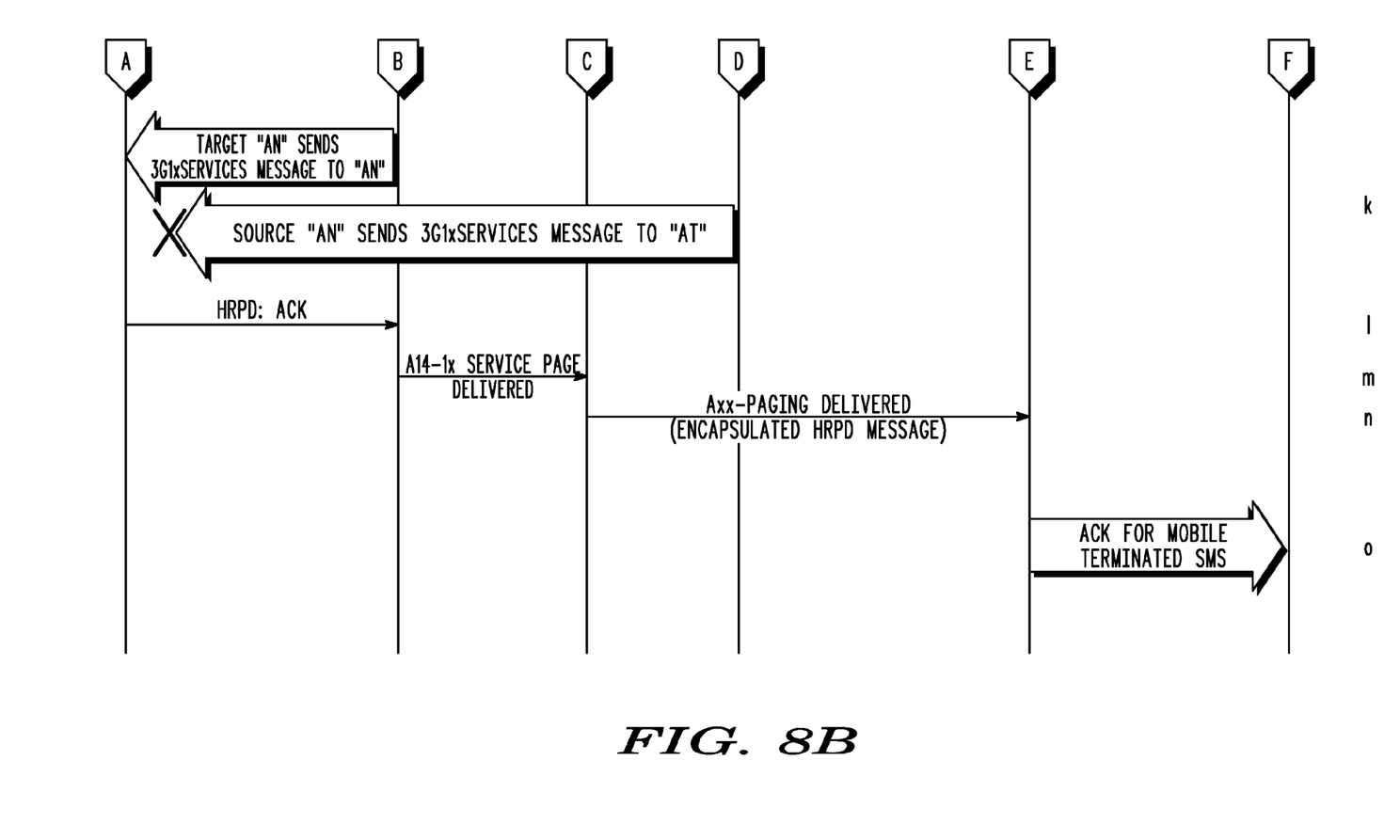

Referring to FIG. 8, a call flow is described for Inter-AN dormant state paging with a mobile terminated SMS delivery when a source PCF wants to page an AT in a sector belonging to a target PCF for A.S0009. In step a), the Source AN/PCF and the Target AN/PCF advertise an overlapping colorcode. The mobile is registered in the Source AN/PCF. The AT registers at a border sector such that the paging area covers a sector belonging to the target AN. This may be due to distance-based paging or subnet hysteresis using a Secondary ColorCode. In step b), the source AN sends an A14-General Update message including Sector ID to the source PCF after the AT has registered with the source AN and starts a timer Tgu14. In step c), the source PCF registers the AT's current location and sends an A14-General Update Complete message to respond to the A14-General Update message. The source AN then stops timer Tgu14. In step d), the 1x system determines that a point-to-point short message is to be sent to an MS/AT. The 1x system sends a message to PCF. (Note: this can be an A1-ADDS Page message if IWS is collocated in PCF; or an A21-1x Air Interface Signaling message if IWS is collocated in 1x BS, or as a standalone entity) to source PCF. In step e), the source PCF sends an A14-1x Service Page message to the AN, and starts timer Tlxsp14. This message includes General page message to be sent over the air. In step f), the AN sends an A14-1x Service Page Acknowledge message to the PCF. The PCF then stops timer Tlxsp14.

In step g), the source PCF determines that the paging area also includes some radio transceivers in the target AN. The source PCF sends an Axx-Paging Request message to the target PCF and starts timer Tpreqack-xx. The Axx-Paging Request message contains SSIR that contain for example, the CSNA attributes, and the Encapsulated HRPD Message, in accordance with the present invention. In this step, the Encapsulated HRPD Message contains the 3G1xServices Message that encapsulates the 1x Data Burst message. In step h), the target PCF sends an Axx-Paging Request Acknowledge message back to the source PCF. Upon receipt of the Axx-Paging Request Acknowledge message, the source PCF stops timer Tpreqack-xx. In step i), the target PCF sends an A14-1x Service Page message to the AN, and starts timer Tlxsp14. In step j), the AN sends an A14-1x Service Page Acknowledge message the PCF. The PCF stops timer Tlxsp14. In step k), based on the received information in Axx-Paging Request message, the source AN and the target AN simultaneously transmit the 3G 1x Services message to the AT over the control channel. This call flow assumes that the AT receives the 3G 1x Services message from the target AN. If the AT receives the 3G 1x Services message from the source AN, then the AT accesses through the source AN. In step 1), if an acknowledgement was solicited, the MS/AT acknowledges the receipt of the message. In step m), upon receiving the HRPD: acknowledgement message, the HRPD AN sends an A14-1x Service Page Delivered message to the target PCF.

In step n), the target PCF sends an Axx-Paging Delivered message that contains Encapsulated HRPD Message to source PCF, in accordance with the present invention. Target PCF starts timer Tprej-xx. In step o), if the 1x system requested an acknowledgment, source PCF replies with an acknowledgement to 1x system.

In addition to the above embodiments, it should be recognized that the present invention would also work in an IEEE 802.11 or 802.16 system if this was not an HRPD system, and we are only dealing with packet data nodes, which would be coupled with an Access Network Authentication, Authorization and Accounting entity through the A12 interface. Typically, as used above, the A13 interface is used for, among other messages, to exchange an A13-Paging Request, A13-Paging Delivered, and A13-Paging Reject message, in accordance with the present invention.

In summary, the present invention provides a system and method, in a communication system infrastructure including a circuit-switched network (cdma2000 1X) and an overlaid packet data network (HRPD), for enhanced Inter-paging between the circuit-switched and packet data networks while reducing the number of registrations needed by the mobile station due to an dormant mobile station moves between subnetworks. In addition, the present invention provides a system and method, in a communication system infrastructure including an packet data network (HRPD), for enhanced Inter-paging while reducing the number of registrations needed by the mobile station due to an dormant mobile station moves between subnetworks.

Figure 9:
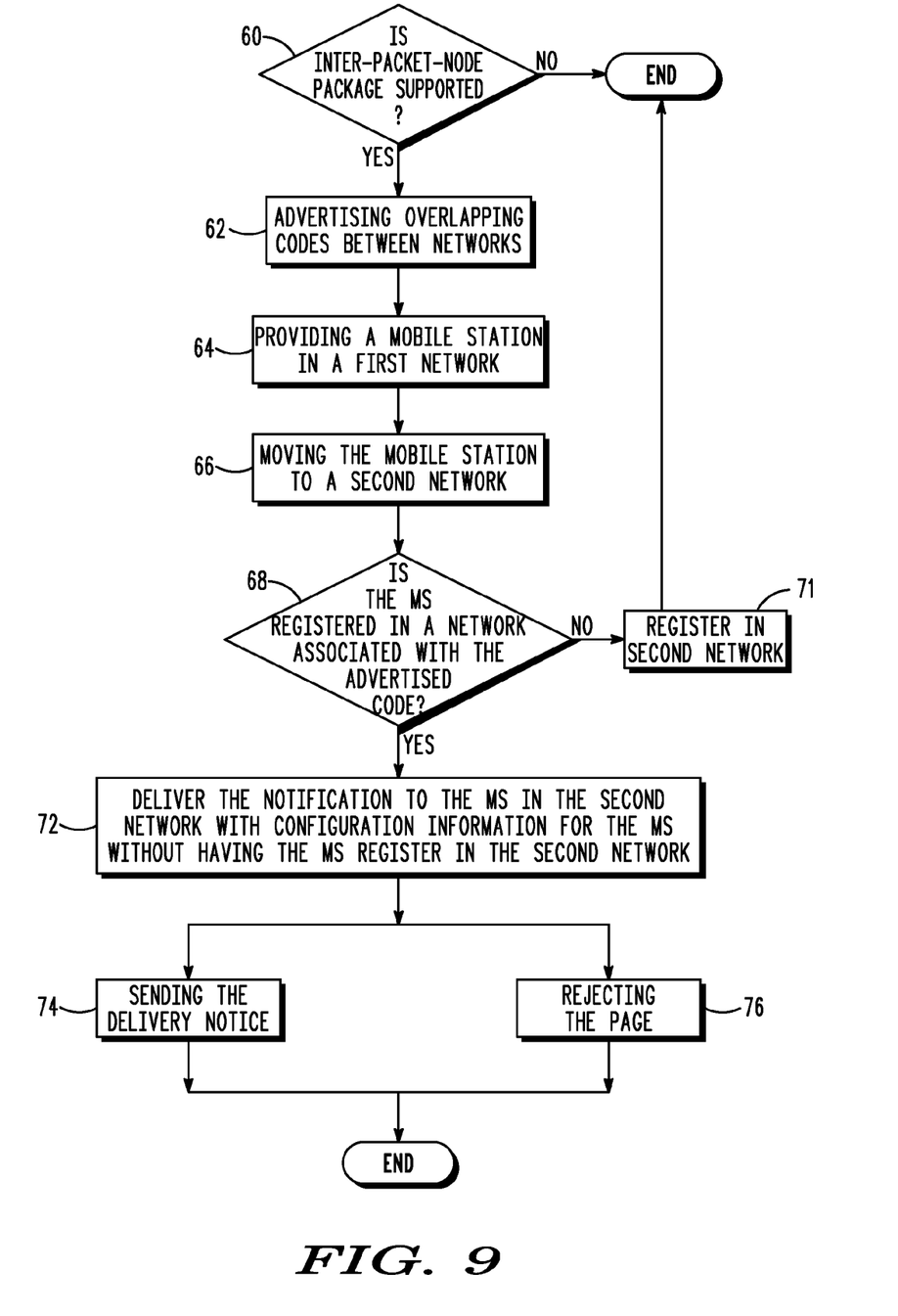
FIG. 9 shows a flow chart describing a method in accordance with the present invention.

Referring to FIG. 9, the present invention can be generalized to cover different scenarios. In a first step 60, as a preliminary measure and in order for the present invention to properly operate, it should first be recognized by the networks whether inter-packet-node paging is supported between the communication networks. As used herein, networks may also refer to subnetworks or zones in a packet data network. For example, the communication networks can be subnetworks of a High Rate Packet Data (HRPD) system allowing cross-paging with a cdma2000 1X circuit-switch system. In another example, the networks can be anyone of; a cdma2000 1X circuit-switch network, a High Rate Packet Data (HRPD) network, and a WiMax network. In one embodiment, a first location area is under the domain of a first packet data subnetwork and a second location area is under the domain of a second packet data subnetwork, both of which may be overlain by a mobile switching center of the 1x cdma2000 system.

In a next step 62, overlapping codes are advertised between first and second communication networks having adjacent location areas. These overlapping codes can include Primary and Secondary ColorCodes or Zones, as described above.

A next step 64 includes providing a mobile station in a first location area served by the first communication network. In practice, the mobile station is in dormant mode with respect to the packet data network.

A next step 66 includes the mobile station moving to the second location area served by the second communication network. Preferably this is done while the mobile station is in dormant mode with respect to the packet data network.

A next step 68 includes determining whether the mobile station is registered in a network associated with the advertised overlapping code. These overlapping codes can include Primary and Secondary ColorCodes or Zones, as described above.

If the second communication network does not share an overlapping code from the mobile station's "registered" network a next step would have been to have the mobile station register 71 with the second network in the normal manner. Otherwise, a next step 72 includes the first communication network informing the second communication network to send notification to the mobile station using information including the notification as well as the configuration information for the mobile station, as supplied by the first communication network. The second network can then deliver the notification to the mobile station within its second location area. This is done without the mobile station having to register in the second communication network. It should be noted that this notification step can comprise sending a HRPD page message from the packet-switched network, or a HRPD DataOverSignaling from the packet-switched network, or a Page message from the circuit-switched network, or a Short Message Service (SMS) message from the circuit-switched network.

In particular, the configuration information includes link information between the first and second communication network. Preferably, the configuration information includes a Session State Information Record (SSIR) that allows the second communication subnetwork to setup a Circuit Services Notification Application (CSNA) for the mobile station, or perform regular Inter-AN paging, or deliver the mobile terminated DataOverSignaling. More specifically, the paging message is sent on an A13 interface between subnetworks of the HRPD packet data system and contains an Encapsulated HRPD Message. The Encapsulated HRPD Message can contain a 3G1xServices Message that further encapsulates a 1x message. The Encapsulated HRPD Message can also contain a HRPD DataOverSignaling, or a HRPD DataOverSignalingAck, or a 3G1xServicesAckthat is to be sent to or from the mobile station.

In a preferred embodiment, the method can include the further steps of sending 74 a message from the mobile station to the first communication network noting the delivery of the page, or allowing 76 the mobile station to reject a page through a message from the second communication network to the first communication network.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method of inter-packet-node paging between communication networks, the method comprising the steps of:
   advertising overlapping codes between first and second communication networks having adjacent location areas;
   providing a mobile station in a first location area served by the first communication network;
   the mobile station moving to the second location area served by the second communication network while the mobile station is in a dormant state; and
   determining whether the mobile station is registered in a network associated with the advertised overlapping codes, wherein if the mobile station is registered in a network associated with the advertised overlapping codes, then informing the second communication network to send notification to the mobile station without the mobile station having to register in the second communication network.

2. The method of claim 1, wherein the informing step includes mobile station configuration information used in the first communication network.

3. The method of claim 2, wherein the mobile station configuration information is the Session Station Information Record (SSIR) in the HRPD network.

4. The method of claim 1, further comprising the step of allowing the mobile station to send an acknowledgement of the delivery to the second communication network, which is then sent in a signaling message to the first communication network.

5. The method of claim 4 wherein the signaling message is one of the group of: an HRPD 3G1xServiceAck message, an HRPD DataOverSignalingAck message, and an HRPD signaling message.

6. The method of claim 1, wherein the informing step includes an encapsulated signaling message.

7. The method of claim 1 wherein the informing step includes a notification from the packet data network consisting of one of the group of: a Page message, a DataOverSignaling message, and a 3G1xServices message.

8. The method of claim 1, wherein the first location area is under the domain of a first packet data subnetwork and the second location area is under the domain of a second packet data subnetwork.

9. A method of cross-paging between a cdma2000 1X circuit-switched system overlaying a plurality of communication subnetworks of a High Rate Packet Data (HRPD) packet data communication system during inter-packet-node paging between subnets of the HRPD system, the method comprising the steps of:
   advertising overlapping color codes between first and second communication subnetworks having adjacent location areas;
   providing a mobile station in a first location area served by the first communication network;
   the mobile station moving to the second location area served by the second communication subnetwork while the mobile station is in a dormant state; and
   determining whether the mobile station is registered in a network associated with the advertised overlapping codes, wherein if the mobile station is registered in a network associated with the advertised overlapping codes, then informing the second communication subnetwork to send notification from the circuit-switch communication network to the mobile station without the mobile station having to register in the second communication network.

10. The method of claim 9, wherein the informing step includes mobile station configuration information used in the first communication network.

11. The method of claim 10 wherein the configuration information is a Session State Information Record (SSIR) that allows the second communication subnetwork to setup Circuit Services Notification Application (CSNA) for the mobile station in the second communication network.

12. The method of claim 9 further comprising the step of:
    allowing the mobile station to send an acknowledgement of delivery of the notification from a third communication network through a message from the second communication network to the first communication network.

13. The method of claim 12, wherein the message consists of an Encapsulated HRPD Message that contains an HRPD signaling message.

14. The method of claim 9 further comprising the step of allowing the mobile station to reject the notification from a third communication network through a message from the second communication network to the first communication network.

15. The method of claim 14, wherein the message consists of an Encapsulated HRPD Message that contains a 3G1xServices message, which encapsulates a 1x message sent from the mobile station when the third communication network is a CDMA2000 1x communication network.

16. The method of claim 15, wherein the 1x message is a 1x Release Order message.

17. The method of claim 9, wherein the informing step contains an Encapsulated HRPD Message.

18. The method of claim 17 wherein the Encapsulated HRPD Message contains an HRPD 3G1xServices Message that further encapsulates one of the group of: a 1x page request and a Data Burst message from the circuit-switched network.

19. The method of claim 9 wherein the informing step includes sending from the packet data network one of the group of: a Page Message, a DataOverSignaling message, a 3G1xServices message, and an HRPD signaling message.

20. A communication system infrastructure providing inter-packet-node paging between first and second communication networks, the infrastructure comprising:
- a mobile station configured for moving between a first location area served by the first communication network and a second location area served by the second communication network; and
- the networks configured for recognizing whether inter-network paging is supported therebetween and for advertising overlapping codes between the first and second communication networks having adjacent location areas, wherein when the mobile station moves from the first network to the second network, the first network determines whether the second communication network shares an overlapping code therewith, wherein if the second communication network shares the overlapping code with the first communication network, then the first network sends a message to the second network informing the second communication network to send notification to the mobile station without the mobile station having to register in the second communication network.

* * * * *